United States Patent [19]

Kamimura et al.

[11] Patent Number: 5,170,556
[45] Date of Patent: Dec. 15, 1992

[54] PRODUCTION METHOD FOR FORGED COMPONENT MADE OF COMPOSITE MATERIAL

[75] Inventors: Tadashi Kamimura, Yokohama; Akira Tujimura, Chigasaki, both of Japan

[73] Assignee: Isuzu Motors Limited, Tokyo, Japan

[21] Appl. No.: 645,909

[22] Filed: Jan. 25, 1991

[30] Foreign Application Priority Data

Jan. 26, 1990 [JP] Japan .................................. 2-14916

[51] Int. Cl.⁵ .......................................... B23P 15/10
[52] U.S. Cl. ...................... 29/888.047; 29/469.5; 29/888.044; 29/DIG. 31
[58] Field of Search ................. 29/422, 419.1, 465, 29/467, 468, 508, 510, 511, 526.3, 888.044, 888.045, 888.046, 888.047, 888.048, 469.5, DIG. 31; 92/176; 419/8, 28

[56] References Cited

U.S. PATENT DOCUMENTS

| | | | |
|---|---|---|---|
| 2,483,075 | 9/1949 | Truesdale | 29/DIG. 31 X |
| 3,340,714 | 9/1967 | Pohl et al. | 29/469.5 X |
| 3,631,583 | 1/1972 | Haller | 29/DIG. 31 X |
| 4,069,042 | 1/1978 | Buchovecky et al. | 419/8 |
| 4,135,286 | 1/1979 | Wright et al. | 419/8 |
| 4,404,262 | 9/1983 | Watmough | 29/888.044 X |
| 4,450,610 | 5/1984 | Schaper | 29/888.046 |
| 4,545,105 | 10/1985 | Kowalsky | 29/469.5 |

FOREIGN PATENT DOCUMENTS

| | | |
|---|---|---|
| 0252193 | 1/1988 | European Pat. Off. |
| 2522103 | 8/1983 | France |
| 2560078 | 2/1984 | France |
| 119348 | 6/1985 | Japan |

Primary Examiner—Joseph M. Gorski
Assistant Examiner—Peter Dungba Vo
Attorney, Agent, or Firm—Browdy and Neimark

[57] ABSTRACT

A production method of a forged component made of a composite material in accordance with the present invention comprises packing pellet or powdery plastic particles, plastic particles coated on the surface with a metallic material or molten plastic material into a cylinder member made of a metallic material, fixing the cylinder member having the plastic material packed thereinto under the closed state by a sheet member made of a metallic material and equipped with an air vent or air vents so as to form an assembly, setting the assembly into a first mold and pressuring a second mold to the assembly so as to forge and mold the assembly into a predetermined shape.

The forged component made of a composite material and produced in accordance with the present invention is light in weight and can be used preferably for producing engage components having high heat-resistance such as a piston. Moveover, if this forged component is a reciprocating component such as a piston, the number of revolutions of an engine can be increased, the striking noise during the engine operation can be reduced and engine performance can be improved.

9 Claims, 1 Drawing Sheet

PRODUCTION METHOD FOR FORGED COMPONENT MADE OF COMPOSITE MATERIAL

BACKGROUND OF THE INVENTION

1. Field of the Invention

This invention relates to a production method for a forged component such as a piston which incorporates a plastic material inside a metallic member.

2. Description of the Prior Art:

Conventionally, components such as pistons for which heat-resistance is required have been produced mainly by heat-resistant aluminum alloy castings or aluminum forgings such as aluminum alloy castings containing nickel (JIS AC8A) and aluminum alloy casings not containing nickel (JIS AC8C). The reduction of the weight of a component of a reciprocating motion system as typified by a piston contributes greatly to the increase in the number of revolutions of an engine, the reduction of striking noise during operation and the improvement in other engine performance.

When the reduction of the weight of components is achieved by use of existing materials such as an aluminum alloy material, rather passive means of analyzing the structure of the component and cutting off its unnecessary thickness is known at present.

If a magnesium alloy casting is employed when the material of the component is changed to other weight-reducing material, the weight becomes about 50% of the weight of the conventional aluminum alloy material and consequently, the effect of weight reduction is great. However, the wall surface of a combustion chamber made of the magnesium alloy must be converted to a heat-resistant structure by use of a ceramic material when the low heat-resistance temperature of magnesium and the level of its high temperature strength are taken into consideration.

If the combustion chamber is made of a plastic material, greater weight reduction can be achieved. However, the heat-resistant temperature of plastic materials is generally about 200° C. or below whereas the temperature of the engine combustion chamber reaches a high temperature of 350° C. and plastic materials cannot withstand this high temperature of 350° C.

Accordingly, in order to accomplish weight reduction of the engine and to obtain a highly heat-resistant structure while using a plastic material, there remains the problem how to manufactures engine components such as pistons.

Japanese Patent Laid-Open No. 119348/1985 discloses a piston for an internal combustion engine and its production method. This piston for the internal combustion engine is constructed whereby the head of the piston is made of a composite comprising a porous inorganic fiber aggregate. A base metal for making the piston is packed into holes in part of the inorganic fiber aggregate and a ceramic material is sprayed onto the surface of the head of the piston so that it can be packed into holes in another part of the inorganic fiber aggregate and a sprayed layer can be formed. Holes in part of the inorganic fiber aggregate are left unpacked by either the base metal or by the ceramic material in such a manner as to form an air layer consisting of porous continuous or discontinuous spaces between the sprayed layer and the base metal.

Furthermore, the production method of a piston for an internal combustion engine disclosed in Japanese Patent Laid-Open No. 119348/1985 described above comprises forming a piston main body by casting while packing a spray metal into holes in part of a porous inorganic fiber aggregate to be fitted to the head of the piston, spraying a ceramic material onto the surface of the head of this piston in such a manner as to be packed into holes in another part of the inorganic fiber aggregate to form a sprayed layer, leaving holes in part of the inorganic fiber aggregate unpacked by the base metal and by the ceramic material, and thus forming an air layer consisting of porous continuous or discontinuous spaces between the sprayed layer and the base metal. When the spray metal is packed into the holes in part of the inorganic fiber aggregate, this production method further includes a step of packing the packing material into the holes in another part of the inorganic fiber aggregate and a step of carrying out the packing process of the spray metal under pressure.

SUMMARY OF THE INVENTION

An object of the present invention is to solve the problems described above. In order to reduce the weight of an engine component such as a piston which is exposed to a high temperature and makes reciprocating motion and to achieve its highly heat-resistant structure, the present invention provides a forged component such as a piston made of a composite material wherein a plastic material is incorporated in a metallic member so as to attain weight reduction and is sealed into the metallic member to attain a highly heat-resistant structure. The present invention also provides a method for making such a component.

It is another object of the present invention to provide a production method for a forged component made of a composite material which comprises packing a plastic material into a metallic cylinder member; closing the cylinder member having the plastic material packed thereinto by a metallic sheet member equipped with air vents so as to fix the metallic sheet member to the cylinder member and to form an assembly; setting the assembly to a first mold; and pressing a second mold to the assembly set to the first mold so as to forge and mold the assembly into a predetermined shape; this thus seals the plastic material into the metallic member, secures the strength of the component itself, reduces drastically the weight and produces an an engine component which is highly heat-resistant, can be exposed to a high temperature and can make a reciprocating motion, such as a piston.

It is still another object of the present invention to provide a production method for a forged component made of a composite material which forms an assembly consisting of a metallic cylinder member, a plastic material packed into the metallic cylinder member and a metallic sheet member equipped with air vents. The method includes closing the cylinder having the plastic material packed thereinto, and forging and molding this assembly into a predetermined shape by first and second molds having predetermined shapes, respectively. This method drastically reduces the weight of the component itself and provides high heat-resistance to it because of its structure wherein the plastic material is sealed into the metallic member.

In the production method of a forged component made of a composite material described above, the plastic material is in the form of a pellet or powdery plastic particles; consequently, the plastic material can be handled easily during the production process, the production process can be simplified and heat-insulating layers can be formed in the spaces between the particles.

Alternatively, in the production method of the forged component made of the composite material described above, the plastic material consists of plastic particles which are coated on their surface with a metallic material. For this reason, the component itself can be constituted in a heat-resistant structure. In other words, the metallic coating material over the plastic particles can reduce the degree of thermosoftening of the plastic material inside them even at a high temperature above the softening point of the plastic material, providing a structure in which the internal plastic particles come to have a high heat-resistance.

Alternatively, in the production method of the forged component made of the composite material described above, the plastic material is a molten plastic material. Accordingly, packing of the molten plastic material into the metallic cylinder member can be made easily and the plastic material can be packed uniformly.

DETAILED DESCRIPTION OF THE EMBODIMENT

Hereinafter, an embodiment of the production method of a forged component made of a composite material in accordance with the present invention will be described with reference to the drawings.

Figure 1:
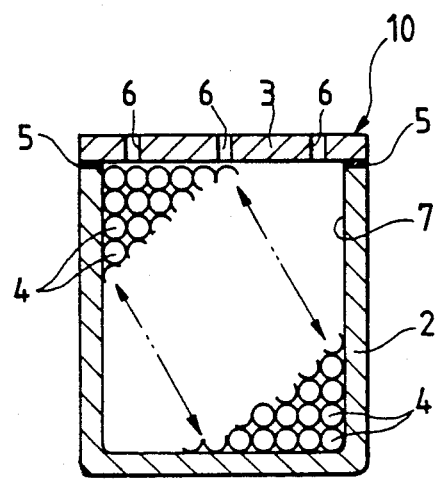
FIG. 1 is an explanatory view useful for explaining an embodiment of the production method of a forged component made of a composite material in accordance with the present invention.
Figure 2:
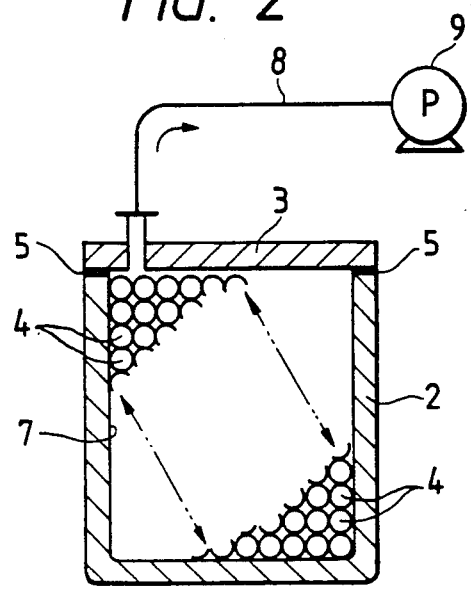
FIG. 2 is an explanatory view useful for explaining another embodiment of the forged component made of a composite material in accordance with the present invention.
Figure 3:
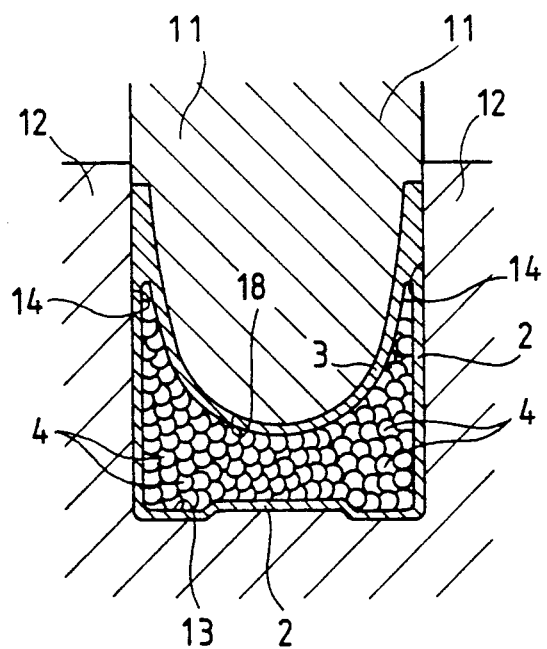
FIG. 3 is an explanatory view useful for explaining the state where an assembly is molded by an upper mold and a lower mold.

FIGS. 1, 2 and 3 show an embodiment of production steps capable of accomplishing the production method of the forged component made of a composite material in accordance with the present invention.

As shown in FIG. 1, a crucible-like bottomed cylinder member 2 is produced by use of a metallic material such as an aluminum alloy for forging (e.g. A6061, A5051) and a sheet member 3 which serves as a cover and is made of a metallic material is produced by use of an aluminum alloy for forging (e.g. A6061, A5051). A plurality of air vents 6 are formed in this sheet member 3. Plastic particles 4 such as pellets or powder are produced by use of a plastic material such as polypropylene and polystyrene resin.

The production method of the forged component made of this composite material is as follows. The plastic particles 4 are packed into the inner space 7 defined by the metallic cylinder member 2 and then the mouth of the metallic cylinder member 2 is closed by the metallic sheet member 3. The contact portion between the metallic cylinder member 2 and the metallic sheet member 3 are bonded by brazing 5 and an assembly 10 is formed by the combination of metallic cylinder member 2, metallic sheet member 3 and plastic particles 4.

Next, FIG. 3 shows an example where a piston as an engine component is molded. In order to mold this assembly 10 by forging, the assembly 10 is placed inside a first mold such as a lower mold 12 fixed at a predetermined position. Next, a second mold such as a moving upper mold 11 is pressed to the lower mold 12 in which the assembly 10 is disposed, so as to mold the assembly in a predetermined shape of a piston. Here, the shape which is formed in advance in the lower mold 12 is a hole-like shape having a bottom surface 13 for forming the head surface 15 of the piston 1 and a cylindrical surface 14 for forming the piston skirt surface 17. The shape which is in advance formed in the upper mold 11 is a projection-like shape having a surface 18 for forming the back surface 16 of the piston 1 on the opposite side to the head surface 15.

The forging temperature of this assembly 10 is preferably from 150° to 300 ° C. in the same way as the temperature at the time of forging of the aluminum material. The plastic particles 4 inside the assembly 10 molded at such a forging temperature are molten inside the metallic cylinder member 2 and flow out via the air vents 6 formed in the metallic sheet member 3. This outflowing plastic material is cut off and removed by machining and the predetermined piston shape is shaped.

Alternatively, in order to prevent the outflow of the molten material of the plastic particles 4 molten inside the metallic cylinder member 2 at the forging temperature described above via the air vents 6 formed in the metallic sheet member 3, a metallic degassing pipe 8 is connected to one air vent 6 formed in the metallic sheet member 3 with the other air vents 6 being closed by welding, or the like, and degassing for removing the air inside the metallic cylinder member 2 therefrom is effected by operating a vacuum pump 9. When forging of the assembly 10 is carried out by the upper mold 11 and the lower mold 12 under this state, the outflow of the molten plastic material from the metallic cylinder member 2 can be prevented.

In the production method of the forged component made of the composite material in accordance with the present invention, the plastic particles 4 of polypropylene, polystyrene, nylon, or the like in pellet or powder form are used as the plastic material to be packed into the metallic cylinder member 2. However, it is also possible to use molten plastic material in place of the particles.

Alternatively, it is also possible to use coated plastic particles by molding plastic material into plastic particles 4 in pellet or powder form and then applying a metallic material such as aluminum, copper, or the like, to the surface of the plastic particles 4, in order to provide the plastic material with heat-resistance.

When the metallic material is applied onto the surface of the plastic particles 4, the following effect can be obtained. Namely, if the plastic particles 4 coated with the metallic material are used inside the metallic cylinder member 2, the degree of softening of the plastic material can be reduced by the coating metal even at a high temperature above the softening temperature of the plastic material inside the metallic cylinder member 2 and consequently, the internal plastic particles 4 become highly heat-resistant.

In this case, nylon 66, polystyrene resin, or the like, can be used as the material of the plastic particles 4 as the nuclei besides polypropylene described above, and these resins are molded into the pellet or powder.

Thereafter, aluminum or copper is plated onto the surface of the resulting plastic particles so as to prepare the particles made of the composite material. It is further possible to use polyolefin resin powder, vinyl chloride resin powder, acrylic resin powder, acrylonitrile resin powder, phenolic resin powder, silicone resin powder, fluororesin powder, and the like, as the plastic material.

Furthermore, substitution plating and electroless plating can be used as the plating or coating technique for the plastic particles 4. Alternatively, the plastic particles 4 can be produced by a magnetron spattering which is developed for mass-production and is a relatively low cost dry process, or powder fluidized bed system electroplating, which is a wet process.

Figure 4:
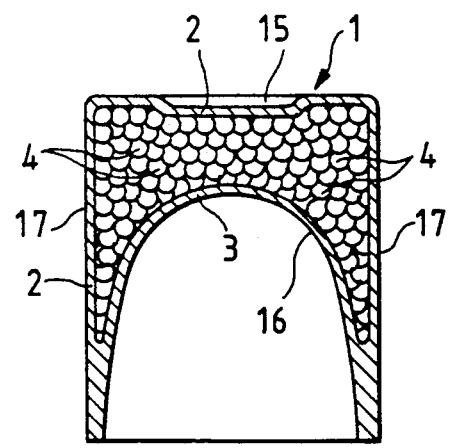
FIG. 4 is a sectional view showing an embodiment of a forged component made of a composite material in accordance with the present invention.

FIG. 4 shows an example of a piston as the forged component made of the composite material and produced in accordance with the production method of the present invention. This piston 1 has the structure wherein its outer peripheral portion is made of an aluminum alloy for forging and the plastic material is packed inside the outer peripheral portion made of the aluminum alloy.

What is claimed is:

1. A method for making a forged component of a composite material comprising:
   producing a cylinder member having an open top end portion and closed bottom portion, said cylinder member being made of a forgeable metallic material;
   producing sheet member with air vents, adapted and constructed to close said open top end portion of said cylinder member, said sheet member being made of a forgeable metallic material;
   introducing plastic material particles having surfaces being coated with a metallic material thereon into said cylinder member through open top end portion;
   forming an assembly by closing said open top end portion of said cylinder member by said sheet member fixing said sheet member to said cylinder member;
   setting said assembly into a first mold having a predetermined shape;
   pressing a second mold having a predetermined shape against said assembly set in said first mold so as to forge said assembly to a predetermined shape and seal said plastic material in a space defined by said cylinder member and said sheet member, wherein said cylinder member and said sheet member form a forged reinforcing product, and said plastic material located in said cylinder forms a weight reducing filler.

2. The method for making a forged component according to claim 1, wherein said metallic material is copper.

3. The method for making a forged component according to claim 1, wherein said plastic particles are made of polypropylene.

4. The method for making a forged component according to claim 1, wherein said plastic particles are made of a polystyrene resin.

5. The method for making a forged component according to claim 1, wherein said plastic particles are pellet-like plastic particles.

6. The method for making a forged component according to claim 1, wherein said plastic particles are material in the form of powdery plastic particles.

7. The method for making a forged component according to claim 1, wherein said metallic material is aluminum.

8. A method for making a forged component of a composite material comprising:
   producing a cylinder member having an open top end portion and a closed bottom and portion, said cylinder member being made of a forgeable metallic material;
   producing a sheet member with air vents adapted and constructed to close said open top end portion of said cylinder member, said sheet member being made of a forgeable metallic material;
   introducing plastic material particles having surfaces being coated with a metallic material thereon into said cylinder member through said open top end portion;
   forming an assembly by closing said open top and portion of said cylinder member by said sheet member and affixing said sheet member to said cylinder member;
   connecting one end of a degassing pipe to said air vents in said sheet member and connecting said degassing pipe at another end thereof to a vacuum pump;
   operating said vacuum pump so as to exhaust the air in said assembly through said degassing pipe;
   closing said air vents in said sheet member, and removing said degassing pipe from said sheet member so as to maintain the interior of said assembly in a state of negative pressure;
   introducing said assembly into a first mold having a predetermined shape; and
   pressing a second mold having a predetermined shape against said assembly so as to forge said assembly and seal said plastic material packed in said cylinder member in a space defined by said cylinder member and said sheet member, wherein said cylinder member and said sheet member form a forged reinforcing product, and said plastic material located in said cylinder member forms a weight-reducing filler.

9. A method for making a forged component of a composite material comprising;
   producing a cylinder member having an open top end portion and a closed bottom portion, said cylinder member being made of a forgeable metallic material;
   producing a sheet member adapted and constructed to close said open top end portion, said sheet member having air vents, said sheet member being made of a forgeable metallic material;
   introducing plastic material into said cylinder member through said open top end portions;
   forming an assembly by closing said open top end portion with said sheet member and fixing said sheet member to said cylinder member;
   setting said assembly into a first mold having a predetermined shape;
   pressing a second mold having a predetermined shape against said assembly set in said first mold so as to forge said assembly to a predetermined shape and seal said plastic material in a space defined by said cylinder member and said sheet member;
   wherein said plastic material is in the form of particles coated with a metallic material.

* * * * *